(12) United States Patent
Gordon et al.

(10) Patent No.: US 11,544,498 B2
(45) Date of Patent: Jan. 3, 2023

(54) TRAINING NEURAL NETWORKS USING CONSISTENCY MEASURES

(71) Applicant: Google LLC, Mountain View, CA (US)

(72) Inventors: Ariel Gordon, Mountain View, CA (US); Soeren Pirk, Palo Alto, CA (US); Anelia Angelova, Sunnyvale, CA (US); Vincent Michael Casser, Cambridge, MA (US); Yao Lu, Shanghai (CN); Anthony Brohan, Palo Alto, CA (US); Zhao Chen, Mountain View, CA (US); Jan Dlabal, Mountain View, CA (US)

(73) Assignee: Google LLC, Mountain View, CA (US)

( * ) Notice: Subject to any disclaimer, the term of this patent is extended or adjusted under 35 U.S.C. 154(b) by 119 days.

(21) Appl. No.: 17/194,090

(22) Filed: Mar. 5, 2021

(65) Prior Publication Data

US 2021/0279511 A1    Sep. 9, 2021

Related U.S. Application Data

(60) Provisional application No. 62/985,861, filed on Mar. 5, 2020.

(51) Int. Cl.
*G06K 9/62* (2022.01)
*G06N 3/04* (2006.01)
*G06N 3/08* (2006.01)

(52) U.S. Cl.
CPC ......... *G06K 9/6256* (2013.01); *G06K 9/6262* (2013.01); *G06N 3/0454* (2013.01); *G06N 3/08* (2013.01)

(58) Field of Classification Search
CPC .. G06K 9/6256; G06K 9/6262; G06N 3/0454; G06N 3/08; G06N 3/084; G06V 10/774
(Continued)

(56) References Cited

U.S. PATENT DOCUMENTS 11,334,766 B2 *   5/2022   Li .............................. G06N 3/08

OTHER PUBLICATIONS

Tarvainen, "Mean teachers are better role models: Weight-averaged consistency targets improve semi-supervised deep learning results" ArXiv Apr. 16, 2018 (Year: 2018).*

(Continued)

*Primary Examiner* — Juan A Torres
(74) *Attorney, Agent, or Firm* — Fish & Richardson P.C.

(57) ABSTRACT

Methods, systems, and apparatus, including computer programs encoded on computer storage media, for training a neural network using consistency measures. One of the methods includes processing a particular training example from a mediator training data set using a first neural network to generate a first output for a first machine learning task; processing the particular training example in the mediator training data set using each of one or more second neural networks, wherein each second neural network is configured to generate a second output for a respective second machine learning task; determining, for each second machine learning task, a consistency target output for the first machine learning task; determining, for each second machine learning task, an error between the first output and the consistency target output corresponding to the second machine learning task; and generating a parameter update for the first neural network from the determined errors.

21 Claims, 3 Drawing Sheets

(58) Field of Classification Search
USPC .......................................................... 382/157
See application file for complete search history.

(56) References Cited

OTHER PUBLICATIONS

Ahmed et al, "Deep learning advances on different 3d data representations: A survey," arXiv, Aug. 4, 2018, 20 pages.
Anil et al, "Large scale distributed neural network training through online distillation," arXiv, Apr. 9, 2018, 12 pages.
Aytar et al, "Tabula Rasa: Model transfer for object category detection", ICCV, Nov. 2011, 8 pages.
Bengio et al, "Representation learning: A review and new perspectives", IEEE Xplore TPAMI, Aug. 2013, 31 pages.
Berkhin, "A Survey of Clustering Data Mining Techniques", Springer, 2006, 47 pages.
Bilen et al, "Integrated perception with recurrent multi-task neural networks," NIPS, 2016, 9 pages.
Byravan et al, "Se3-nets: Learning rigid body motion using deep neural networks", IEEE Xplore ICRA, May 2017, 8 pages.
Caruana, "Multitask learning: A knowledge-based source of inductive bias," ICML, 1997, 35 pages.
Casser et al, "Depth prediction without the sensors: Leveraging structure for unsupervised learning from monocular videos", arXiv, Nov. 15, 2018, 8 pages.
Chen et al, "Efficient and robust parallel dnn training through model parallelism on multi-gpu platform", arXiv, Sep. 8, 2018, 13 pages.
Chen et al, "Gradnorm: Gradient normalization for adaptive loss balancing in deep multitask networks," International Conference on Machine Learning, 2018, 10 pages.
Chen et al, "Revisiting distributed synchronous SGD", arXiv, Apr. 4, 2016, 5 pages.
Cheng et al, "Segflow: Joint learning for video object segmentation and optical flow", ICCV, Oct. 2017, 10 pages.
Cordts et al, "The cityscapes dataset for semantic urban scene understanding",CVPR, Jun. 2016, 11 pages.
Dai et al, "ScanNet: Richly-annotated 3d reconstructions of indoor scenes", CVPR, Jul. 2017, 12 pages.
Dai et al, "Toward understanding the impact of staleness in distributed machine learning," arXiv, Oct. 8, 2018, 19 pages.
Dean et al, "Large scale distributed deep networks", NIPS, 2012, 11 pages.
Dharmasiri et al, "Joint prediction of depths, normals and surface curvature from RGB images using cnns", arXiv, Jun. 23, 2017, 8 pages.
Doersch et al, "A Multi-task self-supervised visual learning", arXiv, Aug. 25, 2017, 13 pages.
Doersch et al, "Unsupervised visual representation learning by context prediction", ICCV, Dec. 2015, 9 pages.
Donahue et al, "Adversarial feature learning", arXiv, May 31, 2016, 11 pages.
Dosovitskiy et al, "FlowNet: Learning optical flow with convolutional networks", ICCV, Dec. 2015, 9 pages.
Dutta et al, "Slow and stale gradients can win the race: Error-runtime trade-offs in distributed SGD", arXiv, Mar. 3, 2018, 17 pages.
Eigen et al, "Depth map prediction from a single image using a multi-scale deep networks", arXiv, Jun. 9, 2014, 9 pages.
Erhan et al, "Scalable object detection using deep neural networks", CVPR, Jun. 2014, 8 pages.
Fernando et al, "Unsupervised visual domain adaptation using subspace alignment", ICCV, Dec. 2013, 8 pages.
Fischer et al, "The streaming rollout of deep networks—towards fully model-parallel execution," arXiv, Nov. 2, 2018, 20 pages.
Fodor et al, "A survey of dimension reduction techniques", National Lab, May 9, 2002, 26 pages.
Fouhey et al, "Data-driven 3d primitives for single image understanding", ICCV, Dec. 2013, 8 pages.

Ghiasi et al, "Nas-fpn: Learning scalable feature pyramid architecture for object detection", IEEE Conference on Computer Vision and Pattern Recognition, Jun. 2019, 10 pages.
Godard et al, "Digging into selfsupervised monocular depth estimation," ICCV, Oct. 2019, 11 pages.
Godard et al, "Unsupervised monocular depth estimation with left-right consistency," CVPR, Jul. 2017, 10 pages.
Gopalan et al, "Domain adaptation for object recognition: An unsupervised approach", IEEE Xplore, Nov. 2011, 8 pages.
Gordon et al, Depth from videos in the wild: Unsupervised monocular depth learning from unknown cameras, ICCV, 2019, 10 pages.
Guo et al, Deep learning for 3d point clouds: A survey, arXiv, Dec. 27, 2019, 24 pages.
He et al, "Mask r-cnn", arXiv, Mar. 20, 2017, 9 pages.
Hickson et al, "Floors are flat: Leveraging semantics for real-time surface normal prediction", arXiv, Jun. 16, 2019, 10 pages.
Hinton et al, "Distilling the knowledge in a neural network", arXiv, Mar. 9, 2015, 9 pages.
Hoffman et al, "Continuous manifold based adaptation for evolving visual domains", CVPR, Jun. 2014, 8 pages.
Hui et al, "LiteFlowNet: A lightweight convolutional neural network for optical flow estimation", CVPR, Jun. 2018, 9 pages.
Jiao et al, "A survey of deep learning-based object detection", IEEE Xplore, Setpember 5, 2019, 33 pages.
Jin et al, "Video scene parsing with predictive feature learning", ICCV, Oct. 2017, 9 pages.
Kendall et al, "Multi-task learning using uncertainty to weigh losses for scene geometry and semantics", CVPR, Jun. 2018, 10 pages.
Kingma et al, "Auto-encoding variational bayes", arXiv, Jan. 21, 2014, 14 pages.
Klasing et al, "Comparison of surface normal estimation methods for range sensing applications", IEEE ICRA, May 12, 2009, 6 pages.
Kokkinos et al, "UberNet: Training a 'universal' convolutional neural network for low-, mid-, and high-level vision using diverse datasets and limited memory", arXiv, Sep. 7, 2016, 19 pages.
Krizhevsky, "One weird trick for parallelizing convolutional neural networks", arXiv, Apr. 26, 2014, 7 pages.
Kulis et al, "What you saw is not what you get: Domain adaptation using asymmetric kernel transforms", CVPR, Jun. 20, 2011, 8 pages.
Kumar et al, "Depthnet: A recurrent neural network architecture for monocular depth prediction", CVPR, Jun. 2018, 9 pages.
Lang et al, "Pointpillars: Fast encoders for object detection from point clouds", CVPR, Jun. 2019, 9 pages.
Lin et al, "Microsoft coco: Common objects in context", ECCV, 2014, 16 pages.
Luc et al, "Predicting deeper into the future of semantic segmentation", ICCV, Oct. 2017, 10 pages.
Malik et al, "The three r's of computer vision: Recognition, reconstruction and reorganization", ScienceDirect, Mar. 1, 2016, 11 pages.
Mayer et al, "Scalable deep learning on distributed infrastructures: Challenges, techniques, and tools", arXiv, Sep. 25, 2019, 35 pages.
Mayer et al, "The tensorflow partitioning and scheduling problem: It's the critical path!" arXiv, Nov. 6, 2017, 6 pages.
McCormac et al, "Scenenet rgb-d: Can 5m synthetic images beat generic imagenet pre-training on indoor segmentation?", IEEE ICCV, Oct. 2017, 10 pages.
Mirhoseini et al, "A hierarchical model for device placement", ICLR, Feb. 15, 2018, 11 pages.
Mirhoseini et al, "Device placement optimization with reinforcement learning", Proceedings of Machine Learning Research, 2017, 10 pages.
Misra et al, "Cross-stitch networks for multitask learning", CVPR, Jun. 2016, 10 pages.
Noroozi et al, "Representation learning by learning to count", arXiv, Aug. 22, 2017, 10 pages.
Noroozi et al, "Unsupervised learning of visual representations by solving jigsaw puzzles", ECCV, Sep. 17, 2016, 16 pages.
Pathak et al, "Context encoders: Feature learning by inpainting", CVPR, Jun. 2016, 9 pages.

(56) References Cited

OTHER PUBLICATIONS

Pentina et al, Multi-task learning with labeled and unlabeled tasks, ICML, 2017, 10 pages.
Qi et al, "Geometric neural network for joint depth and surface normal estimation", CVPR, Jun. 2018, 9 pages.
Ren et al, "Unsupervised deep learning for optical flow estimation", AAAI, Feb. 12, 2017, 7 pages.
Richter et al, "Playing for benchmarks", ICCV, 2017, 10 pages.
Roweis et al, "Nonlinear dimensionality reduction by locally linear embedding", Science, Dec. 22, 2000, 5 pages.
Ruder, "An overview of multi-task learning in deep neural networks", arXiv, Jun. 15, 2017, 14 pages.
Saenko et al, "Adapting visual category models to new domains", ECCV, 2010, 14 pages.
Sener et al, "Multi-task learning as multi-objective optimization", arXiv, Oct. 10, 2018, 15 pages.
Shalev-Shwartz et al, "On the sample complexity of end-to-end training vs. semantic abstraction training", arXiv, Apr. 23, 2016, 4 pages.
Sun et al, "Scalability in perception for autonomous driving: Waymo open dataset", CVPR, Jun. 2020, 9 pages.
Tessler et al, "A deep hierarchical approach to lifelong learning in minecraft", AAAI, Feb. 12, 2017, 9 pages.
Turing, "Computing machinery and intelligence", Springer, Nov. 23, 2007, 28 pages.
Wang et al, "Surge: Surface regularized geometry estimation from a single image", NIPS, 2016, 9 pages.
Wang et al, "Transitive invariance for self-supervised visual representation learning", ICCV, Oct. 2017, 10 pages.
Winograd et al, "Thinking Machines: Can There Be? Are We?", The Foundation of Artificial Intelligence, Semantic Scholar, 2020, 23 pages.
Wu et al, "Google's neural machine translation system: Bridging the gap between human and machine translation", arXiv, Oct. 8, 2016, 23 pages.
Xing et al, "Petuum: A new platform for distributed machine learning on big data", IEEE Transactions on Big Data, Mar. 2015, 17 pages.
Yang, "Adapting svm classifiers to data with shifted distributions", ICDMW, Oct. 2007, 6 pages.
Zamir et al, "Generic 3d representation via pose estimation and matching", ECCV, Sep. 17, 2016, 19 pages.
Zamir et al, "Taskonomy: Disentangling task transfer learning", CVPR, Jun. 2018, 11 pages.
Zhan et al, "Self-supervised learning for single view depth and surface normal estimation", ICRA, May 2019, 7 pages.
Zhang et al, "A survey on multi-task learning", arXiv, Jul. 25, 2017, 20 pages.
Zhang et al, "Colorful image colorization", SpringerLink, Sep. 17, 2016, 18 pages.
Zhou et al, Unsupervised learning of depth and ego-motion from video, CVPR, Jul. 2017, 10 pages.

\* cited by examiner

TRAINING NEURAL NETWORKS USING CONSISTENCY MEASURES

CROSS-REFERENCE TO RELATED APPLICATION

This application claims priority to U.S. Provisional Application No. 62/985,861, filed on Mar. 5, 2020. The disclosure of the prior application is considered part of and is incorporated by reference in the disclosure of this application.

BACKGROUND

This specification relates to neural networks.

Neural networks are machine learning models that employ one or more layers of nonlinear units to predict an output for a received input. Some neural networks include one or more hidden layers in addition to an output layer. The output of each hidden layer is used as input to one or more other layers in the network, i.e., one or more other hidden layers, the output layer, or both. Each layer of the network generates an output from a received input in accordance with current values of a respective set of parameters.

SUMMARY

This specification describes a system implemented as computer programs on one or more computers in one or more locations that trains a first neural network to perform a first machine learning task using a measure of consistency between the outputs of the first neural network and the outputs of one or more second neural networks that are each configured to perform a respective second machine learning task that is different from the first machine learning task. That is, for i) a first output that corresponds to the first machine learning task and that was generated by the first neural network in response to processing a particular training example and ii) for each second machine learning task, a respective second output that was generated by the corresponding second neural network in response to processing the same particular training example, the measure of consistency characterizes a degree to which the first output and the second outputs are consistent with each other, according to a relationship between outputs for the first machine learning task and outputs for the second machine learning tasks.

The system can use a mediator data set to train a first neural network to perform a first machine learning task using outputs of one or more second neural networks configured to perform respective second machine learning tasks. The mediator training set can include unlabeled training examples that can be processed by the first neural network and the second neural networks to generated outputs for the respective machine learning tasks.

For example, the system can process a particular unlabeled training example using the first neural network to generate a first output for the first machine learning task, and can process the particular unlabeled training example using each of the second neural networks to generate respective second outputs for the second machine learning tasks. Using the second outputs and the relationship between outputs of the first neural network and outputs of the second neural networks, the system can generate a target consistency output for the first machine learning task. That is, the target consistency output is an output in the domain of the first machine learning task that, if the first neural network had generated it in response to the particular unlabeled training example, would have been consistent with the second outputs according to the relationship between outputs of the first neural network and outputs of the second neural networks. The system can then determine an error between the first output and the target consistency output, and generate a parameter update for the first neural network from the error.

The subject matter described in this specification can be implemented in particular embodiments so as to realize one or more of the following advantages.

Techniques described in this specification allow for modularized, asynchronous joint training of multiple neural networks. In some implementations, the training system of each neural network is not constrained by timing requirements of co-training with the other neural networks. For example, to determine a consistency measure between the outputs of a particular neural network and the outputs of the other neural networks, the training system of the particular neural network can submit queries ad-hoc to obtain the network outputs of the other neural networks.

Unlike some previous co-training systems, using techniques described in this specification, a training system of each neural network can use different hyperparameters than the training systems of the other neural networks. For example, the training system can use a different optimizer, a different regularization term, a different dropout policy, a different learning rate schedule, and/or a different batch updating policy.

In some existing systems, e.g., in systems in which multiple neural networks share parameters (e.g., sharing a common "backbone" network that has multiple respective "head" networks), co-training multiple neural networks that each have a different complex architecture is impractical due to the expensive computational resource requirements of training each neural network in a single module. The modularity of systems described in this specification allows for more freedom in designing the architectures of the neural networks, so that each neural network can be designed to optimize for the respective machine learning task of the neural network.

In some existing systems, a first neural network for a first machine learning task and a second neural network for a second machine learning task can be trained using the same, twice-labeled training data set, where each training example in the training data set has a first label corresponding to the first machine learning task and a second label corresponding to the second machine learning task. However, training each neural network in isolation on the same training data set can often lead to incoherence between the outputs of the two models. Using techniques described in this specification, a system can enforce a consistency between the outputs of the two neural networks, improving both models.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes a system that trains a neural network using a consistency measure between the network outputs of the neural network and the network outputs of one or more other neural networks.

Figure 1:
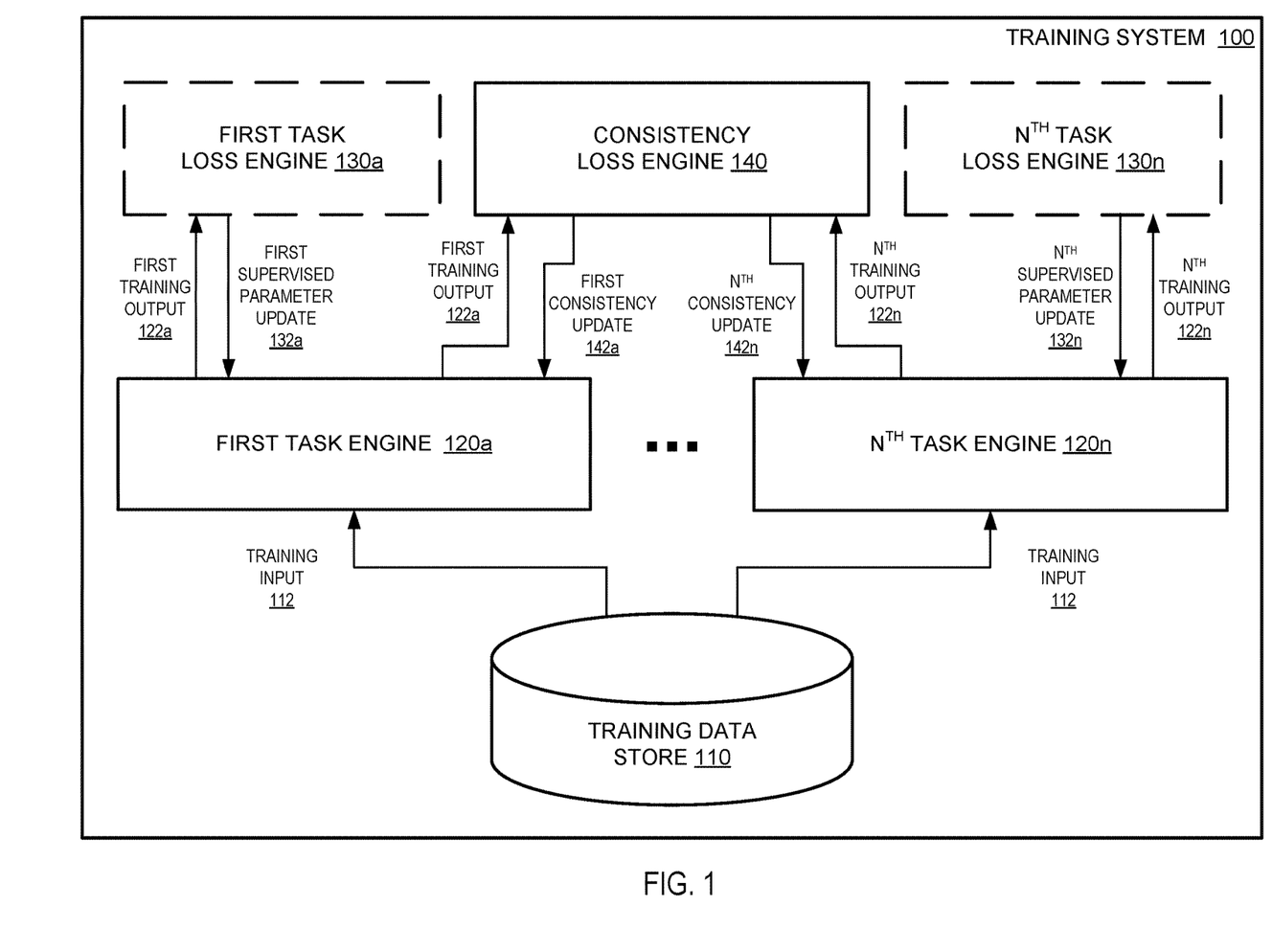
FIG. 1 is a diagram of an example training system.

FIG. 1 is a diagram of an example training system 100. The training system 100 is an example of a system implemented as computer programs on one or more computers in one or more locations, in which the systems, components, and techniques described below can be implemented.

The training system 100 includes a training data store 110, N task engines 120a-n, and a consistency loss engine 140. In some implementations, the training system also includes N task loss engines 130a-n. The training system is configured to execute joint training of N different neural networks, N>1, that each correspond to a respective different machine learning task. Examples tasks are discussed below.

Each task engine 120a-n is configured to process network inputs obtained from the training data store 110 and to generate network outputs using a different respective neural network from the set of N different neural networks. In particular, each task engine 120a-n can obtain the same training input 112 from the training data store 110, process the training input 112 using the respective neural network according to current values of the neural network, and generate a respective training output 122a-n. The training input 112 can be sampled from a training data set that includes training inputs that can be processed by each of the N neural networks to generate a network output for the corresponding machine learning task. In this specification, a data set that includes network inputs that can be processed by each neural network in a set of neural network is called a "mediator" data set.

In some implementations, each training input 112 in the mediator data set of the training data store 110 is unlabeled. In some other implementations, one or more training inputs 112 in the mediator data set are labeled for one or more of the machine learning tasks (i.e., identify a ground-truth output corresponding to the machine learning task). Generally, the labels are not used for determining the measures of consistency, as described in more detail below. The label corresponding to a machine learning task may be used to generate a supervised parameter update for the neural network corresponding to the machine learning task; this process is described in more detail below.

The task engines 120a-n can each provide the respective training output 122a-n to the consistency loss engine 140, which is configured to process the training outputs 122a-n to determine a respective consistency update 142a-n for each neural network. The consistency update 142a-n for a respective neural network is an update to the parameters of the neural network that encourages the outputs of the N different neural networks to be consistent. That is, because the training outputs 122a-n were all generated in response to the same training input 112, the consistency loss engine 140 can determine a degree to which they are consistent with each other, and update the parameters of the neural networks according to the degree.

For each of the N neural networks and using i) the training outputs 122a-n and ii) a known relationship between outputs of the N neural networks, the consistency loss engine 140 can generate a target consistency output for the machine learning task corresponding to the neural network. The target consistency output is an output in the domain of the machine learning task that, if the neural network had generated it in response to the training input 112, would have been consistent with the other training outputs 122a-n according to the relationship between outputs of the neural networks. The consistency loss engine 140 can then determine an error between the training output 122a-n generated by the neural network and the target consistency output, and generate the corresponding consistency parameter update 142a-n for the neural network from the error.

In some implementations, for a particular neural network of the N neural networks, the consistency loss engine 140 determines multiple different target consistency outputs according to respective different known relationships between i) the output of the neural network and ii) the outputs of respective other subsets of the N neural networks. Each known relationship is a relationship between the outputs of the particular neural network (corresponding to a first machine learning task) and the outputs of the neural networks in the corresponding subset of the N neural networks (corresponding to respective other machine learning tasks). The consistency loss engine 140 can determine, for each target consistency output for the particular neural network, an error between the training output 122a-n of the neural network and the target consistency output. The consistency loss engine 140 can then combine the errors to generate a combined error for the particular neural network, e.g., by computing a summation of the errors or by computing an average of the errors, and generate the consistency parameter update 142a-n for the particular neural network using the combined error.

In some implementations, the relationship between a first machine learning task and one or more second machine learning tasks can be defined by an analytical function that maps outputs for the second machine learning tasks to outputs for the first machine learning task; using this analytical function, the consistency loss engine can directly generate target consistency outputs from outputs for the second machine learning tasks.

As a particular example, the first machine learning task can be surface-normal prediction; that is, the first neural network can be configured to process an input image and generate an output that predicts a normal direction for one or more surfaces depicted in the input image. The second machine learning task can be depth estimation; that is, the second neural network can be configured to process an input image and generate a depth output that includes information about the respective distances of one or more objects depicted in the input image from the viewpoint of the input image. Given a depth output that includes a depth value for each pixel in an image, the normal direction for each pixel in the image can be determined by computing a derivative of the depth values. Thus, given a second output corresponding to the depth estimation task and generated by the second neural network in response to processing a particular image, the training system 100 can generate a target consistency output for the surface-normal prediction task by computing the derivative of the depth values for each pixel of the particular image. The training system 100 can then compare the target consistency output with a first output corresponding to the surface-normal prediction task and generated by the first neural network in response to processing the particular image. For example, the training system 100 can determine an error between the first output and the target consistency output, and generate a parameter update for the first neural network using the error. In this way, the training system 100 can enforce "consistency" between the outputs of the first neural network and the outputs of the second neural network.

For instance, the training system 100 can compute the loss between the first output and the target consistency output to be:

$$\mathcal{L}_{con\_normals} = \text{cosine\_distance}(\hat{n}_d, \hat{n}_p).$$

where $\hat{n}_p$ is the surface-normal prediction generated by the first neural network (i.e., the first output) and $\hat{n}_d$ is the surface normal derived from the depth prediction generated by the second neural network (i.e., the target consistency output).

As another particular example, the first machine learning task can be whole-image classification; that is, the first neural network can be configured to process an input image and generate one or more class labels for the input image. The second machine learning task can be image segmentation; that is, the second neural network can be configured to process an input image and generate segmentation data that includes, for each pixel in the input image, a prediction for a class label, such that pixels with the same predicted class label share one or more characteristics. The set of class labels that the first neural network uses to classify images can be the same set of class labels that the second neural network uses to segment images. Thus, given a second output corresponding to the image segmentation task and generated by the second neural network in response to processing a particular image, the training system 100 can generate a target consistency output for the whole-image classification task by determining the class labels to which the second neural network assigned at least one pixel. The training system 100 can then compare the set of particular class labels in the target consistency output with a set if class labels in a first output corresponding to the whole-image classification task and generated by the first neural network in response to processing the particular image. For instance, the training system 100 can compute the error to be the mean-squared error between the first output of the first neural network (i.e., a respective likelihood value corresponding to each possible class label that represents a likelihood that the input image depicts the class label) and the identifications of the class labels corresponding to each segment of the input image identified in the second output of the second neural network. Thus, the training system 100 can enforce that the first neural network outputs for an input image all of the class labels that the second neural network assigns to one or more pixels of the input image.

As another particular example, the first machine learning task can be motion prediction; that is, the first neural network can be configured to process one or more input images each corresponding to a different time point and generate an output that predicts how one or more objects depicted in the most recent input image are moving. The second machine learning task can be image segmentation. Given a first segmented image corresponding to a first time point and a second segmented image corresponding to a second time point that is later than the first time point, the motion of an object that is depicted in both images can be determined by comparing the labeled pixels of the object in each respective image. Thus, given two output images corresponding to the image segmentation task and generated by the second neural network in response to processing respective input images depicting the same scene at different time points, the training system 100 can generate a target consistency output for the motion prediction task by comparing the two output images and determining the motion of the objects depicted between the two time points. The training system 100 can then compare the target consistency output with a first output corresponding to the motion prediction task and generated by the first neural network in response to processing one or more of the input images.

For instance, the training system 100 can compute the loss between the first output and the target consistency output to be:

$$\mathcal{L}_{con\_seg} = \sum_{i,j,c} \mathcal{L}_2(l'_{c1}(i,j), l_{c1}(i,j)) + \sum_{i,j,c} \mathcal{L}_2(l'_{c2}(i,j), l_{c2}(i,j)).$$

where $l_{c1}(i,j)$ is the likelihood that pixel $(i,j)$ of the first image is the class c, $l'_{c1}(i,j)$ is the likelihood that pixel $(i,j)$ of the image at the first time point generated by interpolating the pixels of the second image according to the predicted motion is the class c, $l_{c2}(i,j)$ is the likelihood that pixel $(i,j)$ of the second image is the class c, $l'_{c2}(i,j)$ is the likelihood that pixel $(i,j)$ of the image at the second time point generated by interpolating the pixels of the first image according to the predicted motion is the class c, and $L_2$ is the L2 loss.

As another particular example, the first machine learning task can be depth estimation, and the second machine learning task can be motion prediction. Given two images and a prediction of the motion of one or more objects between the two images, the training system 100 can generate a target consistency output for the depth estimation task by interpolating the depictions of the objects between the two time points using the predicted motion. The training system 100 can then compare the target consistency output with a first output corresponding to the depth estimation task and generated by the first neural network in response to processing one or more of the input images.

For instance, the training system 100 can compute the loss between the first output and the target consistency output to be:

$$\mathcal{L}_{con\_photo} = \sum_{i,j} \mathcal{L}_{ph}(I'_1(i,j), I_1(i,j)) + \sum_{i,j} \mathcal{L}_{ph}(I'_2(i,j), I_2(i,j)).$$

where $I_1$ is the first image $I_2$ is the second image, $I_1'$ is the predicted image at the first time point generated by interpolating the pixels of the second image $I_2$ using the predicted motion generated by the second neural network, $I_2'$ is the predicted image at the second time point generated by interpolating the pixels of the first image $I_1$ using the predicted motion generated by the second neural network, $(i,j)$ are pixel locations in the two images, and $L_{ph}$ stands for a pixelwise photometric loss, e.g., an L1 penalty on the difference in RGB space and structural similarity (SSIM), each weighed by a coefficient.

As another particular example, the first machine learning task can be point cloud object detection; that is, the first neural network can be configured to process a point cloud and generate an output that predicts one or more objects represented by the point cloud. The second machine learning task can be point cloud object tracking; that is, the second machine learning can be configured to process multiple point clouds representing the same environment at respective time points and generate an output that predicts how one or more objects move through the environment at the respective time points. Given a first set of identified objects in a first point cloud corresponding to a first time point and a second set of identified objects in a second point cloud corresponding to a second time point that is later than the first time point, the motion of an object that is identified in both point clouds can be determined. Thus, the training system 100 can generate a target consistency output for the point cloud object tracking task by comparing the relative locations in the two point clouds of each objet identified in both sets of identified objects and determining the motion of the object between the two time points.

For instance, $$\mathcal{L}_{con\_class} = (\text{classlogit}(x,y) - \text{classlogit}(x',y'))^2$$

$$\mathcal{L}_{con\_residual} = \Sigma_{i \in (x,y,\theta)}(di' - di + (\text{flow}_i - (i'-i))^2 + \Sigma_{j \in (z,l,w,h)}(dj' - dj)^2$$

where classlogit (x,y) is the predicted class of the point (x,y) (or voxel (x,y) of the point cloud, after the point cloud has been voxelized into a grid of three-dimensional voxels) of the original point cloud (i.e., a respective likelihood value corresponding to each possible class label that represents a likelihood that the point depicts the class label), classlogit (x',y') is the predicted class of the point (x,y) when the predicted motion of the point is interpolated to a different time point, $\text{flow}_i$ is the predicted flow of dimension i of a voxel, $d_i$ is the change of value of dimension i of a voxel between the two time points, $d_i'$ is the predicted change of the value of the dimension when the original value is interpolated according to the predicted flow, and (x,y,z,w,l,h,θ) are the dimensions of the voxel.

As other particular examples, the first machine learning task and/or the second machine learning task can be one of: a three-dimensional tracking task, a two-dimensional tracking task, a classification task, an object motion prediction task, an egomotion prediction task, a surface-normal prediction task, a depth prediction task, or a semantic segmentation task.

Although many examples included in this specification relate to the computer vision domain, in general the training system 100 can train a neural network to perform a machine learning task in any machine learning domain.

As a particular example, the first machine learning task can be object or action recognition of a video sequence; that is, the first neural network can be configured to process multiple frames of a video and generate an output that predicts actions that are performed in the video or objects that are depicted in the video. The second machine learning task can be speech recognition; that is, the second neural network can be configured to process a sequence of audio data and generate an output that represents text data corresponding to the audio data (e.g., text data representing the same sequence of words spoken in the audio data). Given text data that represents the audio of a video sequence, the training system 100 can generate a target consistency output for the object or action recognition task by determining that objects or actions identified in the text sequence are likely to be depicted in the video sequence.

As another particular example, the first machine learning task can be named entity recognition; that is, the first neural network can be configured to process a text sequence and generate an output that identifies one or more named entities in the text sequence. The second machine learning task can be machine translation; that is, the second neural network can be configured to process a text sequence in a first language and to generate an output that represents a text sequence in a second language. Given two text sequences in respective different languages, the training system 100 can generate a target consistency output for the named entity recognition task by determining that the same named entities are likely to be detected in both text sequences.

In some implementations, the relationship between a first machine learning task and one or more second machine learning tasks is machine-learned. That is, a machine learning model can be configured through training to process network outputs the one or more second neural networks (corresponding to respective second machine learning tasks) and to generate the target consistency output for the first neural network corresponding to the first machine learning task. In some implementations, the machine learning model is pre-trained before the training of the first neural network. In some other implementations, the machine learning model is trained concurrently with the first neural network.

In some implementations, for one or more of the N neural networks, the training system 100 can also execute supervised training of the neural network in conjunction with the training according to consistency described above. For example, for each of the one or more neural networks, the training data store 110 can include a "dedicated" training data set to train the neural network. The dedicated training set can include labeled training examples corresponding to the machine learning task of the neural network.

In particular, the task engine 120*a-n* of the neural network can obtain a labeled training example from the training data store 110 and process the labeled training example using the neural network to generate a training output. The first task loss engine 130*a-n* corresponding to the neural network can then determine a supervised parameter update 132*a-n* according to an error between the training output and the label for the labeled training example.

In some implementations, one or more training examples can be shared between i) the mediator training data set and ii) the dedicated training data sets corresponding to each of one or more neural networks. That is, the shared training examples are included without a label in the mediator training data set, and with a label corresponding to each of the one or more neural networks. For example, as depicted in FIG. 1, the training data store 110 can store, for the training input 112, a label corresponding to the first neural network of the first task engine 120*a* and a label corresponding to the $N^{th}$ neural network of the $N^{th}$ task engine 120*n*. The first task engine 120*a* can then provide the first training output 122*a* to the first task loss engine 130*a*, which can use the label corresponding to the first neural network to generate a first supervised parameter update 132*a* for the first neural network. Similarly, the $N^{th}$ task engine 120*n* can provide the $N^{th}$ training output 122*n* to the $N^{th}$ task loss engine 130*n*, which can use the label corresponding to the $N^{th}$ neural network to generate an $N^{th}$ supervised parameter update 132*n* for the $N^{th}$ neural network In such implementations, the training system 100 can employ any appropriate batch updating policy to train the neural networks. For example, the training system 100 can alternate between i) training example batches that include only training examples from the mediator training data set and ii) training example batches that include only training examples from the dedicated training data sets. As another example, the system can use training example batches that include one or more training examples from both the mediator training data set and the dedicated training data set.

In some implementations, the training system 100 can parallelize the training of the N neural networks by training each neural network using a respective different module, e.g., in a different container or virtual machine or on a different processing device. This process is discussed in more detail below with reference to FIG. 2.

In some implementations, one or more of the N neural networks are pre-trained. That is, the consistency loss engine 140 can obtain the respective consistency training outputs 122a-n from the task engines 120a-n corresponding to the one or more trained neural networks and use the obtained outputs to determine consistency updates 142a-n for the untrained neural networks. However, the consistency loss engine 140 does not generate consistency updates 142a-n for the trained neural networks. As a particular example, all but one of the neural networks can be pre-trained, and the consistency loss engine 140 can determine a consistency update 142 for the one untrained neural network using the outputs 122a-n from each of the task engines 120a-n.

Figure 2:
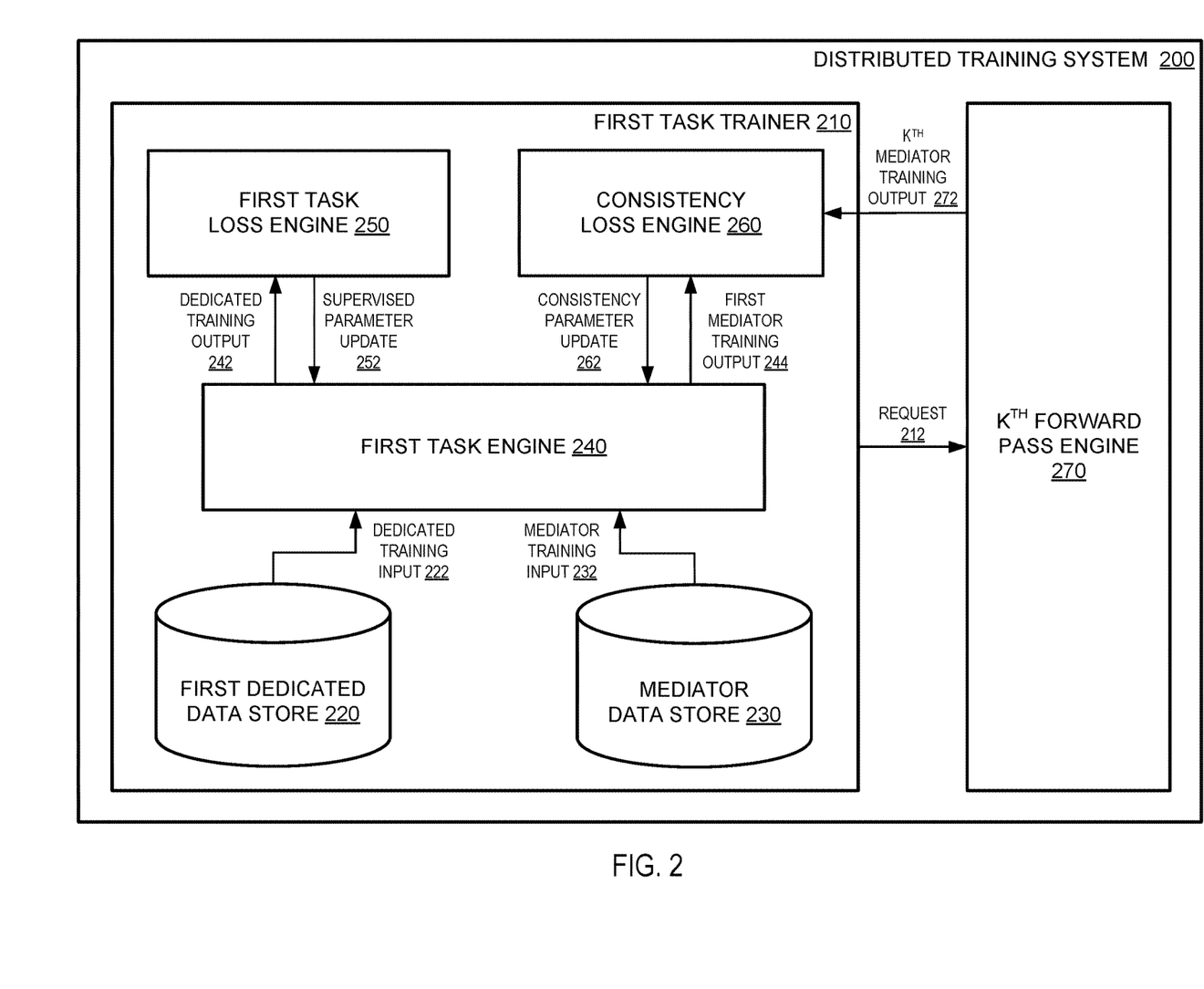
FIG. 2 is a diagram of an example distributed training network.

FIG. 2 is a diagram of an example distributed training system 200. The distributed training system 200 is an example of a system implemented as computer programs on one or more computers in one or more locations, in which the systems, components, and techniques described below can be implemented.

The distributed training system 200 includes N task trainers corresponding to respective different neural networks configured to perform respective different machine learning tasks, as described above with reference to FIG. 1. For clarity, only a first task trainer 210 corresponding to a first task is depicted in FIG. 2. Each task trainer can be hosted on a different node of the distributed training system 200, e.g., a different processing device or a different virtual machine or container.

The distributed training system 200 also includes N forward pass engines that are each configured to execute forward passes (i.e., process network inputs to generate network outputs) for a respective neural network. For clarity, only a $K^{th}$ forward pass engine 270 corresponding to a $K^{th}$ neural network of the N neural networks is depicted in FIG. 2. Each forward pass engine can be hosted on a different node of the distributed training system 200, e.g., a different processing device or a different virtual machine or container.

The first task trainer 210 is configured to train the first neural network, in parallel with the training of the other neural networks by the respective other task trainers of the distributed training system 200. The first task trainer 210 includes a first dedicated data store 220, a mediator data store 230, a first task engine 240, a first task loss engine 250, and a consistency loss engine 260.

The mediator data store 230 can be configured to store a mediator training data set that includes unlabeled training examples that can be processed by each of the N neural networks, as described above with reference to FIG. 1. Each trainer in the distributed training system 200 can include a respective mediator data store 230 storing a copy of the same mediator training data set.

The first task engine 240, which can be configured similarly to the task engines 120a-n depicted in FIG. 1, can obtain a mediator training input 232 from the mediator training data set and process the mediator training input 232 using the first neural network to generate a first mediator training output 244.

The first task engine 240 can provide the first mediator training output 244 to the consistency loss engine 260, which can be configured similarly to the consistency loss engine 140 described with reference to FIG. 1. The consistency loss engine 260 can process the first mediator training output 244 to generate a consistency parameter update 262 to the parameters of the neural network.

To generate the consistency parameter update 262, the consistency loss engine 260 can obtain respective mediator training outputs generated by the other neural networks of the N neural networks in response to processing the same mediator training input 232. In particular, the consistency loss engine 260 can obtain the mediator training outputs from the respective forward pass engines of the distributed training system 200.

For example, the first task trainer 210 can submit a request 212 to the $K^{th}$ forward pass engine 270 to provide the $K^{th}$ mediator training output 272 generated by the $K^{th}$ neural network in response to processing the mediator training input 232.

In response to the request 212, the $K^{th}$ forward pass engine 270 can process the mediator training input 232 using the $K^{th}$ neural network, according to the most recent parameter values of the $K^{th}$ neural network available, to generate the $K^{th}$ mediatory training output 272.

For example, the $K^{th}$ forward pass engine 270 can obtain the latest values for the parameters of the $K^{th}$ neural network from the task trainer of the distributed training system 200 corresponding to the $K^{th}$ neural network. In some implementations, the $K^{th}$ forward pass engine 270 obtains the latest parameters at regular time intervals, e.g., 1 second, 10 seconds, 1 minute, 5 minutes, or 10 minutes. Therefore, in some cases (i.e., in cases where the task trainer of the $K^{th}$ neural network has updated the parameters of the $K^{th}$ neural network but the $K^{th}$ forward pass engine 270 has not yet obtained the updated parameter values), the $K^{th}$ forward pass engine 270 can generate a mediator training output 272 using stale values of the parameters of the $K^{th}$ neural network. In this specification, "stale" values of the parameters of a neural network are values which were used by the training system of the neural network at a previous time point, but which are no longer being used by the training system of the second neural network.

Thus, the consistency loss engine 260 can obtain the respective mediator training outputs of each of the other neural networks. The consistency loss engine 260 can then generate one or more target consistency outputs for the first machine learning task using the obtained mediatory training outputs, as described above, and generate the consistency parameter update 262 using an error between the target consistency outputs and the first mediatory training output 244.

The first dedicated data store 220 stores labeled training examples for training the first neural network. The first task engine 240 can obtain a dedicated training input 222, which has a corresponding label stored in the first dedicated data store 220, and process the dedicated training input 222 using the first neural network to generate a dedicated training output 242. The first task engine 240 can provide the dedicated training output 242 to the first task loss engine 250, which can be configured similarly to the task loss engines 130a-n depicted in FIG. 1 The first task loss engine 250 can determine an error between dedicated training output 242 and the label for the dedicated training input 222, and generate a supervised parameter update 252 for the parameters of the first neural network according to the error.

Each component of the distributed training system 200 can be executed on a different processing device, in parallel. Thus, the training of the N neural networks can be parallelized, significantly reducing the time required for training. Furthermore, each task trainer of the distributed training system 200 (e.g., the first task trainer 210) can use different hyperparameters than the other task trainers, allowing for the hyperparameters to be optimized for each respective different machine learning task. For example, each task trainer can automatically tune its own set of hyperparameters during a hyperparameter search phase, identifying an optimal set of hyperparameters for the corresponding machine learning task.

As described above with reference to FIG. 1, in some implementations, one or more of the N neural networks can be pre-trained. In these implementations, the forward pass engines of the distributed training system 200 corresponding to the trained neural networks can be configured to execute the neural networks according to the final trained parameter values. The consistency loss engine 260 can obtain the respective mediator training outputs 272 corresponding to the one or more trained neural networks and use the obtained outputs to determine the consistency parameter update 262 for the untrained first neural network. As a particular example, each neural network except the first neural network can be pre-trained, and the consistency loss engine 260 can determine a consistency parameter update 262 for the untrained first neural network using the outputs 272 from each of the forward pass engines executing the trained neural networks.

Figure 3:
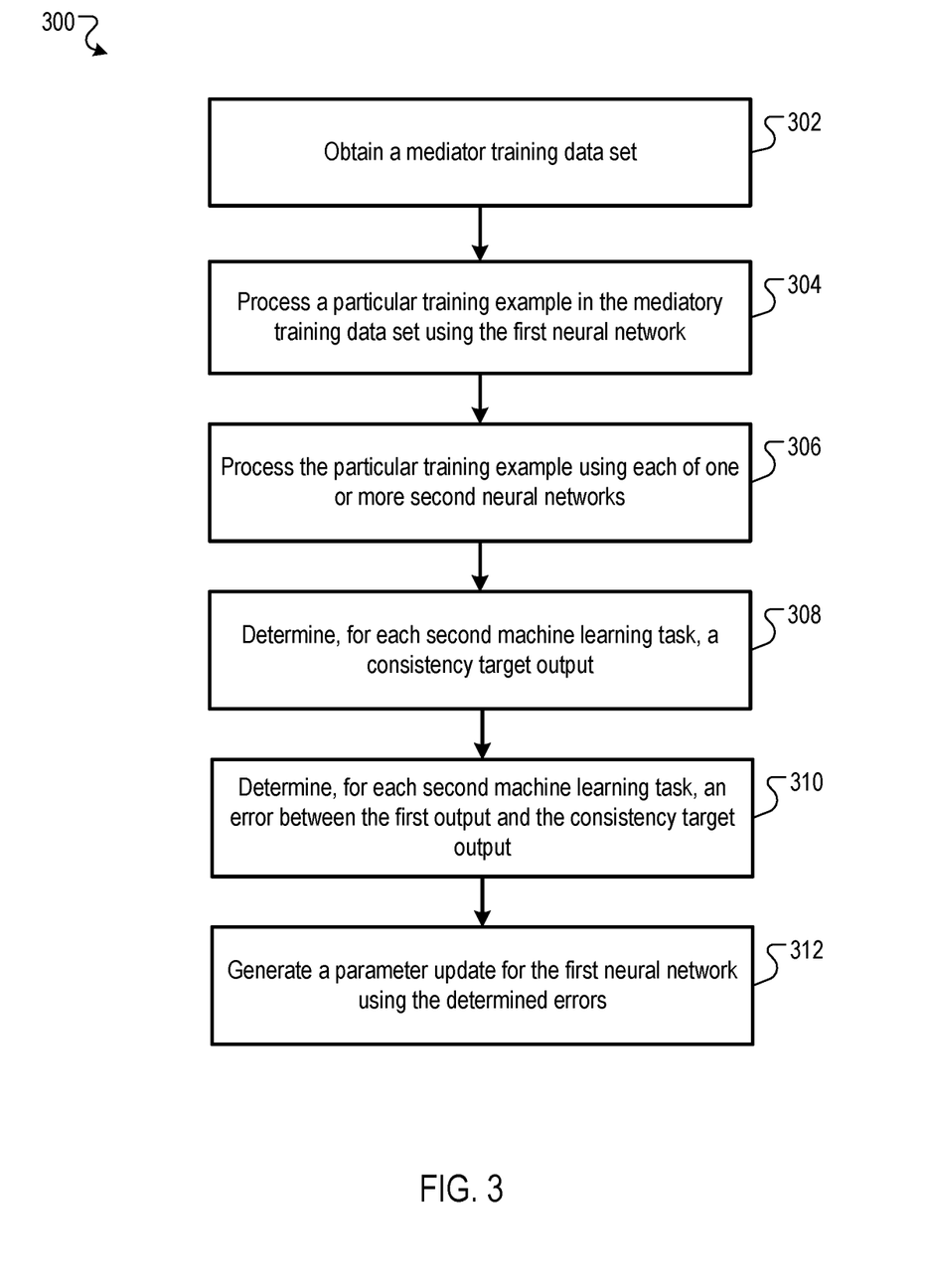
FIG. 3 is a flow diagram of an example process for training a neural network using a consistency measure.

FIG. 3 is a flow diagram of an example process 300 for training a first neural network using a consistency measure. For convenience, the process 300 will be described as being performed by a system of one or more computers located in one or more locations. For example, a training system, e.g., the training system 100 depicted in FIG. 1, appropriately programmed in accordance with this specification, can perform the process 300.

The first neural network has multiple first network parameters, and is configured to execute a first machine learning task.

The system obtains a mediator training data set that includes multiple unlabeled training examples (step 302).

The system processes a particular training example in the mediator training data set using the first neural network to generate a first network output for the first machine learning task (step 304).

The system processes the particular training example using each of one or more second neural networks (step 306). Each second neural network is configured to process the particular training example to generate a second network output for a respective second machine learning task that is different from the first machine learning task.

The system determines, for each second machine learning task and from the second output of the corresponding second neural network, a consistency target output for the first machine learning task (step 308). The consistency target output is an output of the first neural network that would be consistent with a relationship between outputs for the first machine learning task and outputs for the second machine learning task.

The system determines, for each second machine learning task, an error between the first output and the consistency target output corresponding to the second machine learning task (step 310).

The system generates a parameter update for the first neural network from the determined errors (step 312). For example, the system can combine the errors corresponding to the respective second machine learning tasks, e.g., by determine an average or a sum of the errors. The system can then backpropagate the combined error through the first neural network and determine the parameter update using gradient descent. The system can use any appropriate configuration of optimizers to generate the parameter update, e.g., stochastic gradient descent with momentum, adaptive gradients (AdaGrad), or the Adam optimizer.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for training a first neural network having a plurality of first network parameters to perform a first machine learning task, the method comprising:
    obtaining a mediator training data set comprising a plurality of unlabeled training examples;
    processing a particular training example in the mediator training data set using the first neural network to generate a first output for the first machine learning task;
    processing the particular training example in the mediator training data set using each of one or more second neural networks, wherein each second neural network is configured to process the particular training example to generate a second output for a respective second machine learning task that is different from the first machine learning task;
    determining, for each second machine learning task and from the second output of the corresponding second neural network, a consistency target output for the first machine learning task that would be consistent with a relationship between outputs for the first machine learning task and outputs for the second machine learning task;
    determining, for each second machine learning task, an error between the first output and the consistency target output corresponding to the second machine learning task; and
    generating a parameter update for the first neural network from the determined errors.

2. The method of claim 1, further comprising:
    obtaining a dedicated training data set for the first machine learning task comprising a plurality of training examples and a respective label for each training example;
    processing a labeled training example in the dedicated training data set using the first neural network to generate a third output;
    determining a second error between the third output and the label for the labeled training example;
    generating a second parameter update for the first neural network from the second error.

3. The method of claim 1, wherein a particular second neural network is being trained jointly with the first neural network.

4. The method of claim 3, wherein the particular second neural network is trained using a second dedicated training data set for the corresponding second machine learning task.

5. The method of claim 4, wherein one or more shared training examples are in i) the mediator training data set, ii) a first dedicated training data set for the first machine learning task that comprises a plurality of training examples and a respective label for each training example, and iii) the second dedicated training data set, wherein the labels for the shared training examples in the first dedicated training data set correspond to the first machine learning task and the labels for the shared training examples in the second dedicated training data set correspond to the second machine learning task.

6. The method of claim 3, wherein the first neural network and the second neural network are trained using different hyperparameters.

7. The method of claim 6, wherein the different hyperparameters comprise one or more of:
    a different optimization algorithm;
    a different regularization term;
    a different dropout policy;
    a different learning rate schedule; or
    a different batch updating policy.

8. The method of claim 1, wherein processing the particular training example in the mediator training data set using a particular second neural network comprises processing the particular training example in accordance with stale values of a plurality of parameters of the particular second neural network.

9. The method of claim 1, wherein the relationship between the outputs for the first machine learning task and the outputs for a particular second machine learning task is defined by an analytical function that maps outputs for the particular second machine learning task to outputs for the first machine learning task.

10. The method of claim 1, wherein the relationship between the outputs for the first machine learning task and the outputs for a particular second machine learning task is machine-learned.

11. The method of claim 1, wherein each training example in the mediator training data set comprises an image, and wherein the first machine learning task and each of the second machine learning tasks are computer vision tasks.

12. The method of claim 11, wherein the first machine learning task and at least one of the second machine learnings tasks are one of:
    a surface-normal prediction task;
    a depth prediction task;
    a semantic segmentation task;
    a three-dimensional tracking task;
    a two-dimensional tracking task;
    a classification task;
    an object motion prediction task; or
    an egomotion prediction task.

13. A system comprising a respective training system for each of a plurality of neural networks, wherein each neural network is configured to perform a respective different machine learning task, and wherein the training system for each first neural network of the plurality of neural networks corresponding to a first machine learning task comprises:
    one or memories configured to store a copy of a mediator training data set comprising a plurality of unlabeled training examples, wherein the mediator training data set is shared by each training system;
    a respective forward-pass engine corresponding to each second neural network of the plurality of neural networks that is not the first neural network, wherein the forward pass engine for each second neural network is configured to perform operations comprising:
        obtaining parameter values for the respective second neural network;
        receive a particular training example in the mediator training data set; and processing the particular training example using the respective second neural network to generate a second output for the respective second machine learning task that is different from the first machine learning task; and a training engine configured to perform operations comprising:
  processing a particular training example in the mediator training data set using the first neural network to generate a first output for the first machine learning task;
  obtaining a respective second output from each of the one or more forward-pass engines, wherein each second output corresponds to the machine learning task of the respective second neural network that is different from the first machine learning task;
  determining, from each second output, a respective consistency target output for the first machine learning task that would be consistent with a relationship between outputs for the first machine learning task and outputs for the machine learning task corresponding to the second output;
  determining, from each second output, an error between the first output and the respective consistency target output; and
  generating a parameter update for the first neural network from the error.

14. The system of claim 13, wherein obtaining parameter values for the second neural network comprises obtaining the parameter values from the training system corresponding to the second neural network.

15. The system of claim 14, wherein each forward-pass engine obtains parameter values for the respective second neural network from the training system corresponding to the respective second neural network at regular time intervals.

16. The system of claim 13, wherein processing the particular training example using the respective second neural network comprises processing the particular training example in accordance with stale values of the parameters of the respective second neural network.

17. The system of claim 13, wherein each training system trains the respective neural network using different hyperparameters.

18. The system of claim 13, wherein the training engine for each first neural network of the plurality of neural networks corresponding to a first machine learning task is configured to perform operations further comprising:
  obtaining a dedicated training data set for the first machine learning task comprising a plurality of training examples and a respective label for each training example;
  processing a labeled training example in the dedicated training data set using the first neural network to generate a third output;
  determining a second error between the third output and the label for the labeled training example;
  generating a second parameter update for the first neural network from the second error.

19. The system of claim 18, wherein, for a first particular neural network of the plurality of neural networks corresponding to a first particular machine learning task and a second particular neural network of the plurality of neural networks corresponding to a second particular machine learning task, one or more shared training examples are in i) the mediator training data set, ii) a first dedicated training data set for the first machine learning task, and iii) a second dedicated training data set for the second machine learning task, wherein the labels for the shared training examples in the first dedicated training data set correspond to the first machine learning task and the labels for the shared training examples in the second dedicated training data set correspond to the second machine learning task.

20. The system of claim 13, wherein the relationship between the outputs for a first particular machine learning task and the outputs for a second particular machine learning task is defined by an analytical function that maps outputs for the second particular machine learning task to outputs for the first particular machine learning task.

21. One or more non-transitory computer storage media storing instructions that when executed by one or more computers cause the one or more computers to perform a method for training a first neural network having a plurality of first network parameters to perform a first machine learning task, the method comprising:
  obtaining a mediator training data set comprising a plurality of unlabeled training examples;
  processing a particular training example in the mediator training data set using the first neural network to generate a first output for the first machine learning task;
  processing the particular training example in the mediator training data set using each of one or more second neural networks, wherein each second neural network is configured to process the particular training example to generate a second output for a respective second machine learning task that is different from the first machine learning task;
  determining, for each second machine learning task and from the second output of the corresponding second neural network, a consistency target output for the first machine learning task that would be consistent with a relationship between outputs for the first machine learning task and outputs for the second machine learning task;
  determining, for each second machine learning task, an error between the first output and the consistency target output corresponding to the second machine learning task; and
  generating a parameter update for the first neural network from the determined errors.

* * * * *